United States Patent [19]

Murphy, Jr.

[11] Patent Number: 5,677,478

[45] Date of Patent: Oct. 14, 1997

[54] PRESSURE RELIEF SYSTEM FOR FILTRATION TESTING APPARATUS

[75] Inventor: Robert J. Murphy, Jr., Kingwood, Tex.

[73] Assignee: Fann Instrument Company, Houston, Tex.

[21] Appl. No.: 642,774

[22] Filed: May 3, 1996

[51] Int. Cl.$^6$ ................................. G01N 15/08
[52] U.S. Cl. ........................... 73/38; 137/68.23
[58] Field of Search .................. 73/38; 137/68.19, 137/68.22, 68.23; 417/444, 445, 545; 92/9, 181 P

[56] References Cited

PUBLICATIONS

OFI Testing Equipment, Inc. Catalog, Cover plus pp. 47,50, 51 and 55, published before May 3, 1995 Author: OFI Testing Equipment, Inc., 2916 West T.C. Jester, Suite 104, Houston, Tx 77018 Published in 1995.
Fann High Temperature—High Pressure Filter Press Instruction Manual, Rev. D.
Authorized and Published by Fann Instrument Company, P.O. Box 4350, Houston, Tx 77210, 1995.

Primary Examiner—Michael Brock
Assistant Examiner—Jay Politzer
Attorney, Agent, or Firm—Browning Bushman

[57] ABSTRACT

A replaceable primary rupture disk placed in the main body of a cylindrical test chamber functions as a safety device and ruptures to relieve pressure from the chamber when the pressure exceeds a selected maximum value. A free piston that is moveable within the cylindrical to separate the chamber into two variable volume compartments is equipped with a replaceable secondary rupture disk that limits the pressure differential across the piston. The secondary disk ruptures at a pressure differential lower than that required to rupture the primary disk. The maximum pressure that can be contained in any chamber is a pressure equal to the sum of the secondary and primary rupture pressures. The maximum pressure that can be contained in one compartment, if the other is at atmospheric pressure, is the burst pressure of the secondary disk. Threaded end caps are provided with seals that disengage before the threads disengage to bleed down any trapped pressure in the chamber while simultaneously holding the caps to the chamber. Radial spanner wrench openings extending through the cap end are used for tightening and removing the cap and as handling attachment points when the chamber is hot.

19 Claims, 1 Drawing Sheet

PRESSURE RELIEF SYSTEM FOR FILTRATION TESTING APPARATUS

FIELD OF THE INVENTION

The present invention relates generally to testing apparatus for determining the effects of fluid materials passing through a permeable solid material. More specifically, the present invention relates to a pressure relief system for preventing fluid pressures in a permeability plugging test chamber from exceeding safe levels and for ensuring the release of any high pressure fluids from the chamber before the chamber is fully opened.

BACKGROUND OF THE INVENTION

Some of the effects of a particular drilling or completion fluid on a permeable, subsurface well formation may be predicted by subjecting the fluid to permeability plugging tests. In these tests, the test fluid is forced through a filter having a porosity approximating that of the subsurface formation. The test is conducted under temperature and pressure conditions approximating those anticipated to be present at the subsurface formation.

The test temperatures and pressures may be high enough to cause injury and damage during the performance of the testing as well as during the disassembly of the apparatus for evaluation of the test results. A problem encountered in the prior art is that dangerous pressure buildup may occur in the test chamber during the testing without the test operator's knowledge. It is also possible in these prior art test devices to unexpectedly encounter trapped pressure during the disassembly of the test apparatus. The high temperature required in some of these tests may also make it difficult to safely handle the test apparatus immediately following the testing procedure.

One prior art test chamber employed to conduct permeability plugging experiments, employs a cylindrical container that is separated into a drive fluid compartment and a sample fluid compartment by a free piston that can move axially through the cylinder. Pressurized hydraulic oil is applied to the drive fluid compartment to drive the piston through the cylindrical chamber. The test sample, contained in the fluid sample compartment, is forced to flow through a filter at the end of the compartment as the piston advances through the chamber. The test chamber is also frequently heated to high temperatures to simulate expected down-hole conditions. A common danger presented in testing is that the operator may leave both the supply and exit valves to the test chamber closed causing excessive pressure build-up due to thermal expansion of the fluids in the chamber during the hearing process.

The pump applying pressure to the hydraulic fluid is also capable of generating pressures in excess of the pressure that may be safely contained in the chamber. Some test conditions also require the application of a back pressure on the test fluid. During the course of the testing, the fluid sample compartment, as well as the drive fluid compartment, may frequently contain fluids with high temperature and high pressure values that may be unsafe if not recognized and properly handled.

Another problem occurs if the internal piston becomes wedged or is otherwise immobilized causing the pressure in one or the other of the two compartments to increase without producing any piston movement. The possibility of trapped pressure behind an immobilized piston also presents a potential danger in that the apparatus may burst apart during disassembly as its retaining structure is being loosened or removed to evaluate the filter sample.

Generally, the prior art test devices used in high pressure and high temperature tests are subjected to a potential over-pressure problem any time the chamber pressure is controlled by external regulators and controls. Failure of these external devices may allow the chamber itself to be over pressurized during the testing process. Another problem is that prior art chambers may malfunction and retain pressurized fluid in the test chamber after the test is completed. When such a chamber is disassembled to retrieve the sample filter piece, the trapped pressure may cause the chamber to burst open violently.

BRIEF DESCRIPTION OF THE INVENTION

A primary rupture disk is provided in the drive fluid side of the test chamber to provide a fail safe mechanism for limiting the maximum pressure applied to the drive fluid side of the chamber. A secondary rupture disk is provided in the system to burst and provide a fluid path between the drive side and the sample side of the chamber when a predetermined pressure differential exists across the piston. The secondary disk ruptures at a relatively low pressure differential that is substantially lower than that required to burst the primary disk.

The design of the present invention ensures that neither the drive fluid chamber nor the fluid sample chamber can have a pressure that exceeds the maximum allowed chamber pressure nor can either chamber have a pressure that is different from the other by an amount in excess of the low pressure rupture disk rupture pressure.

The end assemblies of the chamber of the present invention are further provided with a structure that allows the end assemblies to be partially removed to disengage chamber pressure seals while maintaining mechanical engagement with the chamber body. The result is that any confined pressure in the chamber is allowed to bleed off before the end assemblies are mechanically disengaged from the cylinder body.

From the foregoing it may be appreciated that a primary object of the present invention is to provide a pressure relief system that prevents excessive pressure from being applied to a test facility chamber.

Another object of the present invention is to provide a pressure relief system that allows the slow reduction in pressure of a trapped fluid in a test facility chamber while maintaining the components of the test facility structurally bound together.

An important feature of the present invention is the provision of a pressure relief device in the floating piston of the testing chamber so that the pressure differential across the piston is limited by the pressure relief device, whereby, the relief device will open and the pressure across the piston equalize if the piston bottoms out at one end of the chamber and a pressure differential above that of the pressure relief device occurs.

These and other advantages, features and benefits of the present invention will be more fully appreciated and understood from the following drawings, description and claims.

DETAILED DESCRIPTION OF THE PREFERRED EMBODIMENTS

Figure 1:
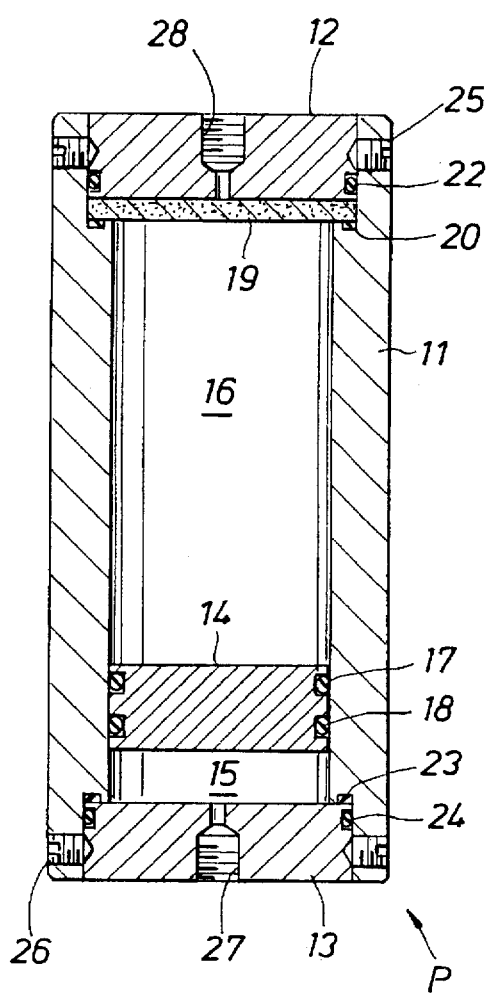
FIG. 1 is a vertical cross-sectional view of a prior art test apparatus.

A prior art design for the test apparatus employed to obtain porosity plugging data is illustrated generally at P in FIG. 1. The apparatus P is in the form of a tubular body 11 equipped with circular end caps 12 and 13. A cylindrical free piston 14 disposed within the body 11 is designed to move axially through the cylindrical bore of the body 11 to divide the internal confines of the test apparatus into two separate chambers 15 and 16. Sliding o-ring seals 17 and 18 carried by the piston 14 provide a leak proof, sliding seal between the piston 14 and the internal cylindrical wall of the body 11.

A filter medium in the form of a circular test piece 19 is positioned at the upper end of the body 11. The test piece 19 may be a ceramic disk that has a porosity approximately that of the subsurface formation that is to be drilled into or treated. An o-ring seal 20 seats between the filter disk and the housing 11 to prevent fluid leakage around the edges of the disk. An o-ring seal 22 carried by the upper end cap 12 seals with the cylinder wall 11 to prevent leakage between the chamber wall and the end cap. At the lower end of the tubular body 11, o-ring seals 23 and 24 cooperate with the lower end cap 13 to prevent leakage from the chamber 15.

The end cap 12 is held in place by set screws 25 that extend through the wall 11 into the upper end cap. Similar set screws 26 extend through the wall 11 into the lower end cap 13 to hold it in place. Allen head recesses are provided in the set screws 25 and 26 to be engaged by a matching tool for insertion and removal of the set screws. In one prior art design, each of the end caps is held in place by approximately six set screws, equally distributed around the periphery of the test apparatus.

A threaded access port 27 opens through the bottom end cap into the chamber 15. A similar access port 28 opens through the upper end cap 12 into the chamber 16.

In operation, a fluid test sample disposed in the sample fluid compartment formed by the chamber 16 is displaced from the chamber 16 through the filter disk 19 by upward movement of the piston 14. A pressurized hydraulic fluid is applied through the access port 27 to pressurize the drive fluid compartment formed by the chamber 15 to force the piston 15 upwardly through the tubular housing 11.

The pressure and temperature extremes expected in the well are reproduced in the test apparatus. These pressures can reach 2500 psi or greater and the temperatures can reach 500° F. or higher.

The pressure applied to the chamber 15 is controlled by an external pumping system (not illustrated) that pressurizes the hydraulic fluid to a pressure value sufficient to induce a pressure differential across the filter disk that approximates the expected subsurface pressure differentials. An external heating system (not illustrated) heats the test apparatus while it is under pressure to the anticipated subsurface well temperature. In some applications, the fluid sample compartment 16 may be subjected to a back-pressure to better simulate the actual use condition of the fluid. The back-pressure in the chamber 16 is controlled by an external pressure control system (not illustrated).

As thus described, it will be appreciated that the chambers 15 and 16 may be subjected to pressures that are controlled by systems externally of the apparatus P. If these external systems malfunction, the pressure in the chambers 15 and 16 may exceed the burst capacity of the apparatus P causing an explosive release of hot test fluid.

Following completion of a test, it is necessary to remove the end cap 12 to retrieve the filter disk 19. The end cap 13 must also be removed to clean and recondition the apparatus P. It will be appreciated that it is possible that blockage of the ports 27 or 28 will allow external pressure regulating a gauging equipment to indicate that the chambers 15 or 16 are not pressurized even though they may in fact be highly pressurized. For example, if the piston 14 is bottomed out against the lower end cap 13 and the access port 28 is plugged or otherwise sealed over, the pressure in the chamber 16 may be extremely high while pressure monitors externally of the apparatus P will indicate that the apparatus has no internal pressure. A similar situation may occur in the chamber 15 if the piston 14 bottoms out against the upper end cap 12. In this case, if the port 27 is blocked, the chamber 15 may contain a high pressure charge without any indication of such being present on external pressure monitors connected to the ports 27 and 28. A related problem arises if the piston 15 becomes bound up, wedges or otherwise becomes immobilized at some intermediate position between the two end caps.

The problem of trapped pressure in the test apparatus P is severe in that the pressure may be suddenly released as the apparatus is being disassembled. Thus, if the set screws 25 or 26 are being removed from a pressurized test apparatus, the end cap may suddenly release from the body 11 when a set screw is removed.

Figure 2:
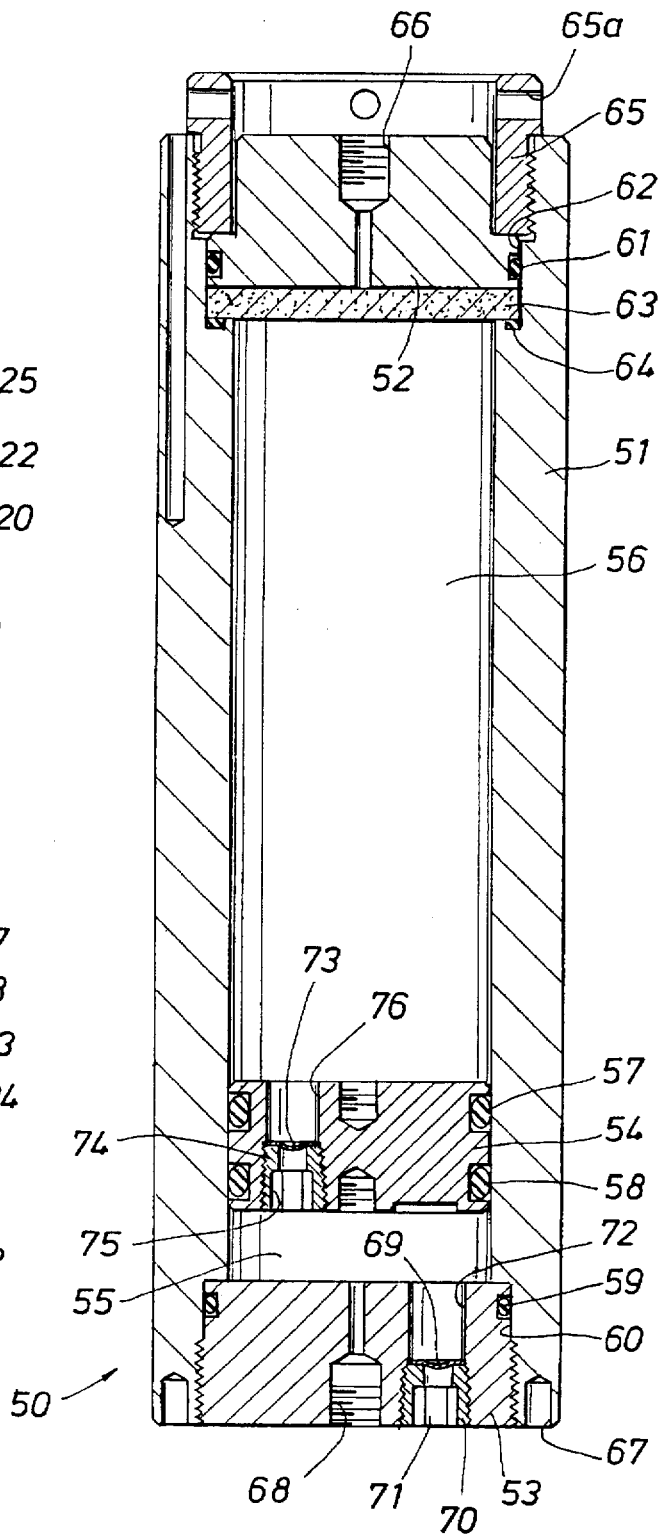
FIG. 2 is a vertical cross-sectional view of a test apparatus equipped with the pressure release system of the present invention.

The test apparatus of the present invention is indicated generally at 50 in FIG. 2. The apparatus 50 is formed from a tubular body 51 that is sealed at its ends by an upper end cap 52 and a lower end cap 53. A free piston 54 carried within the tubular body 51 is disposed to move axially through the central bore of the body 51 while maintaining a sliding seal with the internal wall of the central bore. The piston 54 separates the chamber within the body 51 into a drive fluid compartment 55 and a test fluid compartment 56. O-ring seals 57 and 58 carried by the piston 54 provide a sliding, sealing engagement with the compartment walls. An o-ring seal 59 provides a seal between the bottom end cap 53 and an annular seal area 60 formed within the tubular body 51. A similar o-ring seal 61 provides a seal between the upper end cap 52 and an annular seal area 62 formed within the body 51. A filter disk 63 positioned between the end cap 52 and the body 51 is sealed at its edges by an o-ring 64.

The upper end cap 52 is held in place on the body 51 by a retainer ring 65 that is threadedly engaged with threads formed at the upper end of the tubular body. The upper end of the ring 65 extends above the body 51. Radial openings 65a formed through the upper end of the ring 65 are provided for engagement by a spanner wrench (not illustrated) that is used to engage or release the retainer ring from its threaded engagement with the body 51. The openings 65a also provide a convenient attachment point for handling the apparatus 50 when it is hot. A central access port 66 extends through the upper end cap to provide communication with the sample chamber 56.

The lower end cap 53 is retained in positioned at the bottom of the body 51 by the engagement of threads formed on the connecting circumferential surfaces of the cap 53 and the bottom of the tubular body 51. Longitudinal bores 67 are adapted to be engaged by a spanner wrench to engage or disengage the threads connecting the end cap 53 and the body 51. A port 68 extends through the bottom end cap to provide access to the fluid drive chamber 55.

The bottom end cap 53 is equipped with a primary pressure control means comprising a rupture disk 69 carried at the bottom of a threaded retainer sleeve 70. The rupture disk and sleeve 70 are a unitary assembly. A hex-head opening 71 extending through the sleeve 70 is adapted to receive a wrench (not illustrated) that may be employed to engage or disengage the sleeve from the end cap 53 as required to replace or repair the rupture disk and sleeve assembly. An axially extending bore 72 in the end cap 53 permits fluid flow from the chamber 55 when the disk 69 ruptures.

A secondary pressure control mechanism is provided by a similar rupture disk 73 and integral sleeve 74 in the piston 54. A hex-head opening 75 is provided for engaging and disengaging the sleeve and disk from the piston. An axially extending bore 76 in the piston 54 permits fluid flow between the chambers 55 and 56 when the disk 73 ruptures.

In the operation of the test apparatus 50, the rupture disk 69 bursts to release the pressure in the chamber 55 at any point the chamber pressure exceeds the burst pressure of the disk. The burst pressure of the disk 69 is selected to be well below that which may be safely contained by the test apparatus 50, an exemplary value being 2500 psi. It will be appreciated that the pressure in the chamber compartment 55 may never exceed the burst value of the disk 69 so that a primary pressure control is provided for the chamber 55 that is independent of any external monitoring or control equipment.

The burst pressure differential of the disk 73 in the piston 54 is selected to be a relatively low pressure, for example, 250 psi. The disk 73 will burst to permit fluid flow between the chambers 55 and 56 at anytime the pressure differential across the disk exceeds 250 psi. Under normal operating conditions, the pressure differential across the piston 54 is substantially zero so long as the piston is freely moving through the tubular body 51. If the piston stops its movement while being exposed to a pressure differential, the pressure differential may only increase until the limiting value of the rupture disk 73 is reached. If the higher pressure exists in the fluid chamber 56, rupture of the disk 73 will communicate the test fluid with the hydraulic drive fluid. If the pressure of the test fluid then exceeds the burst pressure of the disk 69, the disk 69 will rupture to release the pressure in the apparatus 50. From the foregoing, it will be appreciated that the maximum pressure that can be contained in the chamber 56 is limited to the value of the rupture pressure of the disk 73 plus that of the disk 69, or in the example given, 3,250 psi. Again, the limiting pressure value is provided independently of any external controls or regulators.

During disassembly of the test apparatus 50 for retrieval of the test disk 63, the top end cap 52 is unthreaded from the upper end of the body 51. The initial unthreading rotation draws the o-ring seal 61 above the annular sealing surface 62 so that an escape path is provided for any pressure trapped in the chamber 56. At the point the seal 61 disengages the seal area 62, the end cap still maintains threaded engagement with the tubular body 51 so that it is prevented from breaking away from the body under the influence of the trapped pressure. In a preferred embodiment, two or more full threads of engagement remain after the seal has been broken. Once the pressure has been fully relieved, the end cap may be completely unthreaded from the body 51 to provide access to the filter sample 63.

If high pressure is trapped in the chamber 55 when the end cap 52 is partially opened to relieve pressure in the chamber 56, the rupture disk 73 will rupture if the differential between the chamber 55 and the chamber 56 exceeds the burst pressure of the disk. Thus, for example, if the piston 54 is stuck with pressure in the chamber 55 and in the chamber 56, release of the pressure in the chamber 56 will create a pressure differential across the disk 73 that, if sufficiently large, will rupture the disk to allow release of the pressure in the chamber 55. This safety pressure release will thus occur at a pressure level well below that required to rupture the primary rupture disk 69.

The initial unscrewing of the bottom cap 53 also releases any trapped pressure in the chamber 55 in a manner similar to that described with references to the top cap 52. The initial turning of the cap 53 disengages the seal 59 from the sea/surface 60 to allow the chamber 55 to bleed down while at least one or more threads remain engaged between the cap 53 and body 51. In a preferred embodiment, two or more threads remain engaged when the seal is broken.

From the foregoing it will be appreciated that the test apparatus of the present invention provides a fail safe system for limiting the maximum pressure that may be applied to a test apparatus. The system of the present invention also provides a means for limiting the pressure differential between two chambers within a test apparatus so that if either chamber is depressurized, the pressure in the other cannot exceed a selected pressure. Further, the present invention provides a means for depressurizing a pressurized chamber by disassembling the chamber while simultaneously retaining the chamber component mechanically engaged.

The foregoing disclosure and description of the invention is illustrative and explanatory thereof. It will be appreciated by those skilled in the art that various changes in the size, shape and materials, as well as in the details of the illustrated construction. The combinations of features and the method steps discussed herein may be made without departing from the spirit of the invention.

What is claimed is:

1. A pressure control system for use with a filtration medium in a pressurized apparatus comprising:

a chamber structure defining a chamber for containing pressurized fluids;

a divider piston within said chamber for separating said chamber into first and second pressure isolated areas;

a first pressure responsive relief mechanism for providing a fluid communication passage from said first area to an area external to said chamber when the pressure in said first area exceeds a first predetermined pressure value;

and a second pressure responsive relief mechanism for providing a fluid communication passage between said first and second pressure areas through said divider piston when the pressure in said first area differs from the pressure in said second area by a second predetermined pressure value.

2. A pressure control system as defined in claim 1, wherein said first and second pressure responsive relief mechanisms comprise rupture disks.

3. A pressure control system as defined in claim 1, wherein said first pressure value is greater than said second pressure value.

4. A pressure control system as defined in claim 1, further comprising access means on said chamber structure for engagement with a retaining device for handling said system.

5. A pressure control system as defined in claim 1, further comprising:

a first access port opening through said chamber structure into said first pressure area;

a second access port opening through said chamber structure into said second pressure area;

a filter medium disposed intermediate said second area and said second access port whereby fluid in said second area flows through said filter medium before it exits said second area through said second access port.

6. A pressure control system as defined in claim 1, further comprising:

first removable access structure for opening said chamber structure into said first area;

first sealing structure for sealingly engaging said first access structure with said chamber structure to maintain a pressure seal between said first access structure and said chamber structure; and first release structure for releasing said first sealing structure from sealing engagement with said chamber structure while simultaneously holding said first structure in mechanical engagement with said chamber structure.

7. A pressure control system as defined in claim 6, further comprising:

second removable access structure for opening said chamber structure into said second area;

second sealing structure for sealingly engaging said second access structure with said chamber structure to maintain a pressure seal between said second access structure and said chamber structure; and second release structure for releasing said second sealing structure from sealing engagement with said chamber structure while simultaneously holding said second structure in mechanical engagement with said chamber structure.

8. A pressure control system as defined in claim 1, further comprising:

removable access structure in said chamber structure for gaining access to said second pressure isolated area;

sealing structure carried by said access structure and moveable into and out of sealing engagement with said chamber structure for respectively maintaining or releasing a pressure seal between said access structure and said chamber structure; and retaining structure for mechanically securing said access structure to said chamber structure when said sealing structure is moved out of sealing engagement with said chamber structure.

9. A pressure control system as defined in claim 3, wherein:

said access structure comprises an end cover at one end of said chamber;

said sealing structure comprises an annular resilient seal disposed between said end cover and said structure and adapted to engage and seal with an annular seal surface between said chamber structure and said end cover; and said retaining structure comprises mating threads on said end cover and said chamber structure.

10. A pressure control system as defined in claim 8, further comprising access openings in said access structure for engagement with a retaining device for securing said access structure to said retaining device.

11. A pressure control system as defined in claim 1, wherein:

said chamber comprises an axially extending cylindrical chamber; and said divider comprises a free piston adapted to move axially through said chamber.

12. A pressure control system as defined in claim 11, further comprising:

removable access structure in said chamber structure for gaining access to said second pressure isolated area;

sealing structure carried by said access structure and moveable into and out of sealing engagement with said chamber structure for respectively maintaining or releasing a pressure seal between said access structure and said chamber structure; and retaining structure for mechanically securing said access structure to said chamber structure when said sealing structure is moved out of sealing engagement with said chamber structure.

13. A pressure control system as defined in claim 12, wherein:

said access structure comprises an end cover at one end of said chamber;

said sealing structure comprises an annular resilient seal disposed between said end cover and said structure and adapted to engage and seal with an annular seal surface between said chamber structure and said end cover; and said retaining structure comprises mating threads on said end cover and said chamber structure.

14. A pressure control system as defined in claim 11, wherein said first and second pressure responsive relief mechanisms comprise rupture disks.

15. A pressure control system as defined in claim 14, wherein said first pressure value is greater than said second pressure value.

16. A pressure control system as defined in claim 15, further comprising:

removable access structure in said chamber structure for gaining access to said second pressure isolated area;

sealing structure carried by said access structure and moveable into and out of sealing engagement with said chamber structure for respectively maintaining or releasing a pressure seal between said access structure and said chamber structure; and retaining structure for mechanically securing said access structure to said chamber structure when said sealing structure is moved out of sealing engagement with said chamber structure.

17. A pressure control system as defined in claim 16, wherein:

said access structure comprises an end cover at one end of said chamber;

said sealing structure comprises an annular resilient seal disposed between said end cover and said structure and adapted to engage and seal with an annular seal surface between said chamber structure and said end cover; and said retaining structure comprises mating threads on said end cover and said chamber structure.

18. A pressure relief system for use with a filtration medium in a pressurized vessel, comprising:

a first confined area in said vessel for containing a first fluid;

a second confined area in said vessel for containing a second fluid;

said first and second confined areas being separated from each other by a piston fluid barrier;

a first pressure relief structure connected with said first confined area for relieving the pressure of said first fluid in said first area when the pressure of said first fluid exceeds a first predetermined value;

and a second pressure relief structure in said fluid barrier for communicating the fluid in said first area with the fluid in said second area when the fluid pressure differential across said fluid barrier exceeds a second predetermined value, different from said first predetermined value.

19. A pressure relief system as defined in claim 18, wherein:

said fluid barrier is moveable through said chamber under the influence of pressure in said first area; and said pressure relief structures comprise pressure sensitive rupture disks.

* * * * *